April 19, 1932. G. H. PHELPS 1,854,909
MAKING WELDED JOINTS OF RADIATORS AND OTHER STRUCTURES
Filed Jan. 26, 1928 2 Sheets-Sheet 1

Fig.1ª

INVENTOR
GEORGE H. PHELPS.
BY
Anthony Using, ATTORNEY

April 19, 1932. G. H. PHELPS 1,854,909
MAKING WELDED JOINTS OF RADIATORS AND OTHER STRUCTURES
Filed Jan. 26, 1928 2 Sheets-Sheet 2
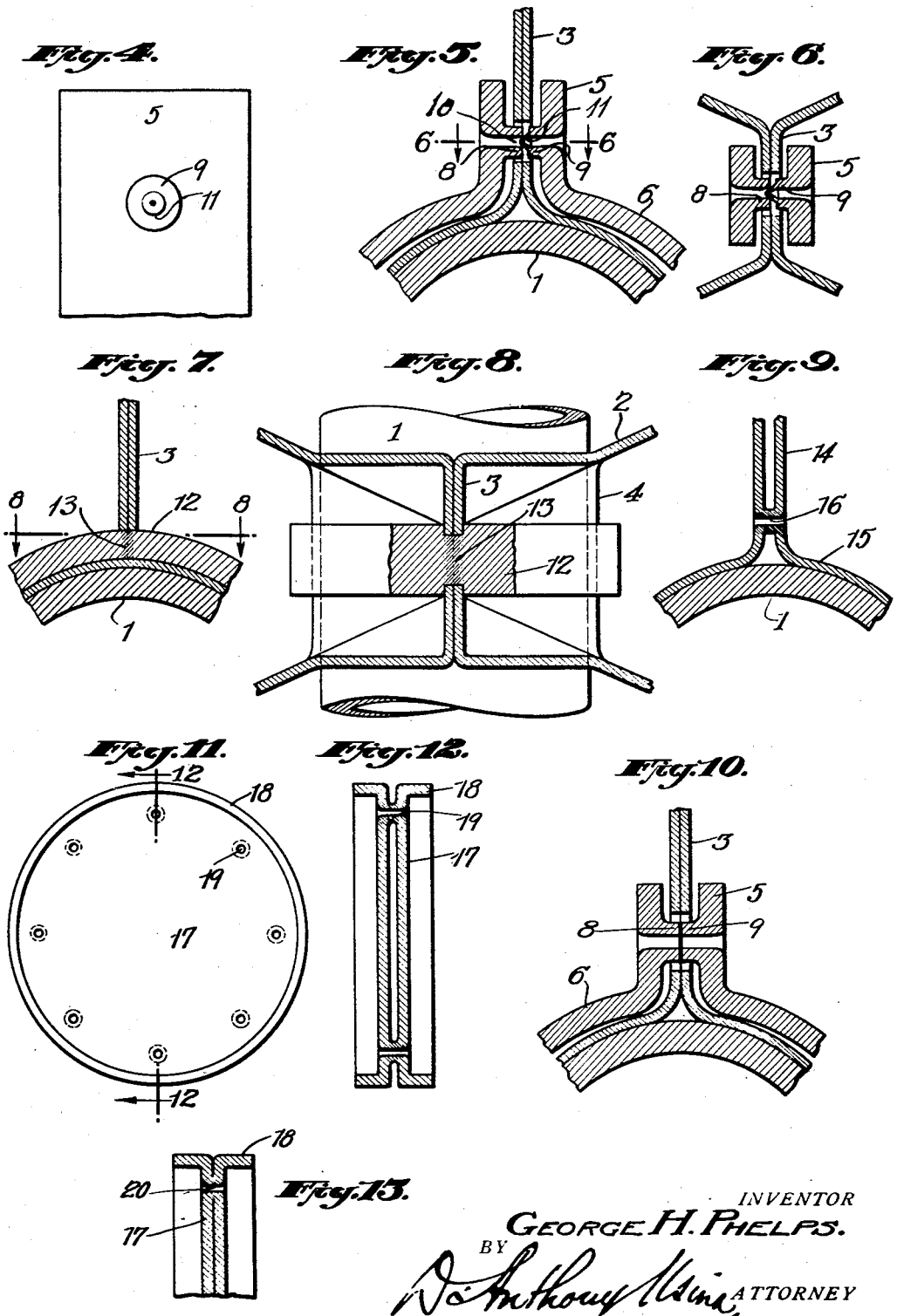
INVENTOR
GEORGE H. PHELPS.
BY
ATTORNEY Patented Apr. 19, 1932

1,854,909

UNITED STATES PATENT OFFICE

GEORGE H. PHELPS, OF WAREHOUSE POINT, CONNECTICUT, ASSIGNOR TO THOMAS E. MURRAY, OF BROOKLYN, NEW YORK; JOSEPH BRADLEY MURRAY, THOMAS E. MURRAY, JR., AND JOHN F. MURRAY, EXECUTORS OF SAID THOMAS E. MURRAY, DECEASED, ASSIGNORS, BY MESNE ASSIGNMENTS, TO METROPOLITAN ENGINEERING COMPANY, A CORPORATION OF NEW YORK

MAKING WELDED JOINTS OF RADIATORS AND OTHER STRUCTURES

Application filed January 26, 1928. Serial No. 249,538.

In certain previous applications, particularly those of Murray and Bennett Nos. 203,437 and 203,438, filed July 5th, 1927, there is described a radiator comprising a steam pipe or other heating element and a radiating structure of sheet metal applied thereto by means of supplementary straps welded to each other through the sheet metal.

The present invention is directed to a welded joint and method which are particularly designed for radiators of the same general class, and which are useful also in various other structures.

The accompanying drawings illustrate embodiments of the invention.

Fig. 1 is a side elevation of the upper portion of the end of a radiator;

Fig. 1ᵃ is a plan of the same;

Fig. 4 is a face view of an end of one of the straps;

Fig. 5 is a longitudinal section of the parts before welding;

Fig. 6 is a cross-section of the same on the line 6—6;

Fig. 7 is a view similar to Fig. 2 of an alternative construction;

Fig. 8 is a section on the line 8—8 of Fig. 7;

Fig. 9 is a section similar to Fig. 2 of an alternative construction;

Fig. 10 is a section similar to Fig. 5 illustrating a modification;

Fig. 11 is an elevation and Fig. 12 a cross-section on the line 12—12 of a brake drum made of two plates welded together;

Fig. 13 is a section similar to Fig. 12 illustrating a modification.

Figure 1:
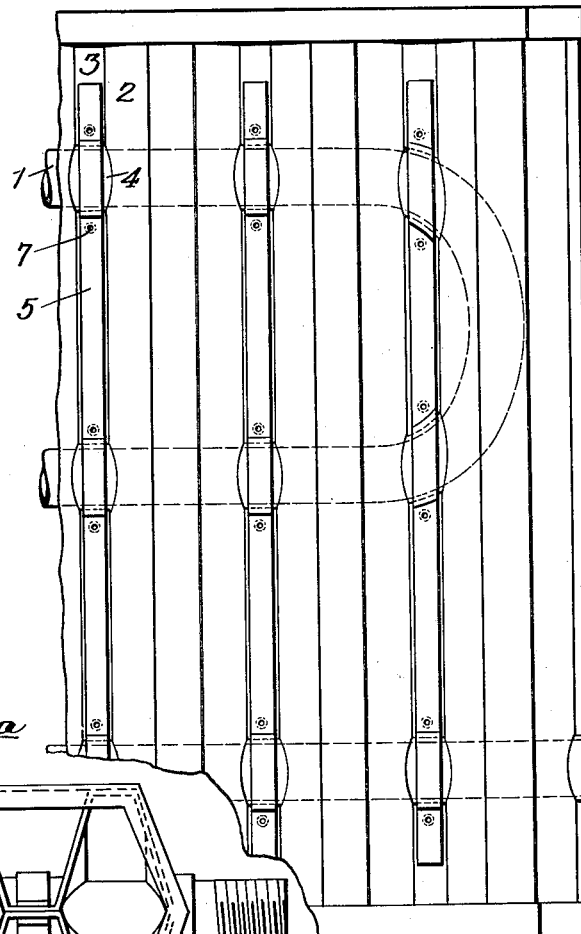

Fig. 1 illustrates the application to a steam pipe 1 of a radiating structure comprising metal sheets corrugated to form laterally extending fins 2, slightly oblique, and longitudinally extending portions 3 which are bent outwardly at intervals to form recesses 4 embracing the pipe 1 between them. The pipe and the corrugated plates are preferably copper or aluminum or other metals or alloys of comparatively high electrical and heat conductivity.

The spot welding of such metals is almost or quite impracticable because of the rapid conduction of the current and the heat from the points to be joined as well as the high electrical conductivity of the metal itself. This difficulty is avoided, according to the inventions of the above cited applications, by the application of welding straps 5 of steel or ferrous metal, and the present invention provides an improved method of welding such straps. The straps are provided with recesses 6 which embrace the copper sheet around the pipe and are welded together to form joints indicated as a whole by the numeral 7 between the opposite straps 5 and extending through the plates 3.

According to the previous application the sheets 3 and the straps 5 were pressed together between electrodes while passing a current so that the sheets became alloyed with or dissolved into the steel of the straps.

Figure 2:
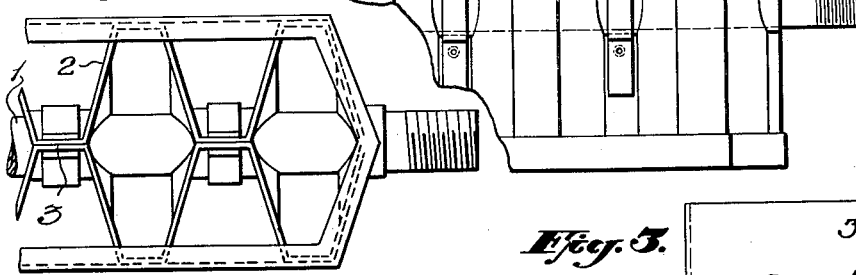
Fig. 2 is a vertical section through one of the joints of Fig. 1.
Figure 2:
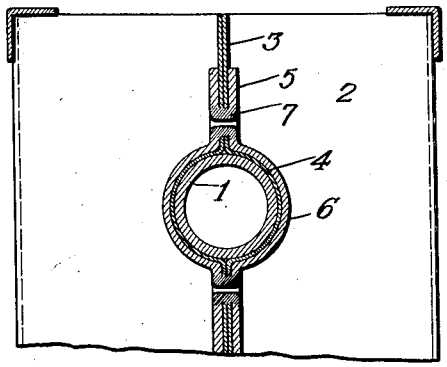
Figure 3:
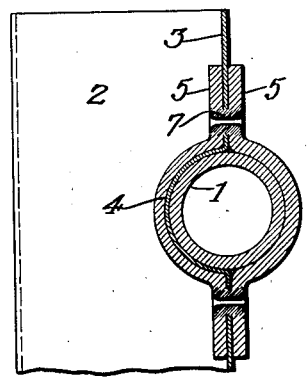
Fig. 3 is a similar section through a joint of an alternative style of radiator.

In applying the present improvement to such radiators the sheets 3 are provided with holes through which portions of the straps extend and are welded to each other. Fig. 2 shows the plates 3 united by straps 5 with welded joints 7 passing through openings in the plates. Fig. 3 shows a similar method of attaching a single copper plate 3 to a pipe 1. The copper plate is recessed at 4 to extend partially around the pipe. Steel straps 5 are placed in position and welded to each other at 7 through holes in the single copper sheet.

With this method the straps 5 need not be of steel. They may be of other metals, such as brass or even copper. Since during the heating period the straps are nowhere in intimate contact with anything but the electrodes and each other (see Fig. 5), there is no reason why the straps cannot be made of any material which can be formed to the desired shape and which can be butt welded.

Figs. 4, 5 and 6 show the particular method of welding proposed. The straps are punched to form short tubular projections 8 and 9 with squared edges which make a butt weld when pressed between electrodes and heated by the current. One of the tubular projections, 8, is provided with a flat face and the other with a conical point or pilot 11 which enters the other projection when the parts are assembled. This serves to bring the projections 8 and 9 into correct alignment and to hold them so during the initial stages of the welding operation. The point is so fine that it does not alter the shape of the main part of the projection nor alter the character of the weld as a true butt weld. The process, therefore, obtains the excellent and uniform welds characteristic of the butt method, and the abutting projections are made self-aligning in the welding machine by the lateral engagement of the point 11 in the opposite direction.

The methods described above may be used also for uniting parts analogous to the steel straps to other parts analogous to the copper sheets without the inclusion of the pipe and in various other structures than radiators. For radiators (as well as other structures) the straps and the welding projections which pass through the sheet or sheets may be variously shaped.

In Figs. 7 and 8, for example, the straps are in the form of half rings 12, the ends of which are reduced and passed through openings in the sheets 3 and butt welded to form ties 13.

The same method of welding may be applied directly to the sheets, without the use of supplementary straps. Fig. 9 shows such a construction with sheets 14 having recesses 15 which embrace the pipe 1, the sheets having projections on their adjacent faces which are welded together to provide ties 16. This involves a space between the opposed sheets which is determined by the regulating of the size of the projections and the take-up during the welding operation. Such a construction is particularly useful in making radiators with fins or other radiating structure of steel or similar metal.

Fig. 10 is a section similar to Fig. 5 in which the projections 8 and 9 are simple tubular projections with squared ends abutting against each other. This type of projection (omitting the lateral engagement of the rib and groove 11 and 10 of Fig. 5) is used where other means are provided for holding the straps in proper register during the welding operation.

Figs. 11 and 12 illustrate a brake drum made of two discs 17 with outward flanges 18. The discs are punched to provide projections which are welded together to provide substantially integral connections 19, which at the same time serve as spacers to maintain the desired width and lateral stiffness of the drum. Or the two discs 17 may be brought close together at the end of the welding operation, as in Fig. 13. The tubular projections are entirely taken up in the welding operation, leaving short ties 20 which hold the two plates close together. Thus this process may be used in many cases as a substitute for spot welding with the advantage that many welds may be made simultaneously, and with the further advantage that the resulting welds are of a far better quality. By this butt welding method any molten or burned metal is extruded from the joint.

The projections may be of various shapes, sizes and locations according to the metal and the character of the work. And in the welding of two pieces to each other through a hole in one or more intermediate pieces, projections may be used on only one instead of both of the two outer pieces.

For radiators, this style of joint has particular advantages over soldering, clamping and similar methods previously used for attaching fins or radiating structures to steam or hot water pipes or to electric heating elements. In the use of such radiators the alternate expansion and contraction of the heating element causes a great strain on the joints between the pipe and the radiating structure and may in time destroy the intimate connection which is important in securing a rapid transfer of heat. Some such methods of uniting the heating elements and the radiating structure are also tedious and therefore expensive.

The joints of the present invention can be made, all or in large groups at one machine operation so as to be quite economical. And they hold the parts together unyieldingly and at the same time stiffen the tubes and the radiating plates so as to permit the making of these of the desired thin metal and of such comparatively soft metals as the desired high conductive copper and the like.

There is a peculiar advantage also in the use of straps of steel (in which term I include ferrous metals generally) where the heating element or the radiating structure or both are of copper (in which term I include cuprous metals generally) the higher coefficient of thermal expansion of the copper results in a greater enlargement of the latter as the temperature is raised so that it expands to a greater extent than the steel and increases the intimacy of contact with the radiating structure and thus increases the conductivity of the joint. The comparatively slight expansion of the steel will be within its elastic limit so that when the radiator is cooled the steel will return to its original dimensions and will grip the parts together with its original efficiency. No claim is made in the present application to the radiator, such claims being presented in a divisional application Ser. No. 369,622 filed June 10, 1929.

Various other modifications may be made by those skilled in the art without departing from the invention as defined in the following claims.

What I claim is:

1. A welded structure comprising two pieces united face to face by projections extending inward from the adjacent faces, said projections being welded to each other at their forward ends and being of tubular form with central openings extending to their forward ends.

2. A welded structure comprising two pieces united face to face by projections extending inward from the adjacent faces, said projections being welded to each other at their forward ends and being of tubular form with central openings extending to their forward ends, said welded projections constituting spacers of determined length holding said pieces correspondingly spaced apart.

3. A welded structure comprising two pieces united face to face by projections extending inward from the adjacent faces, said projections being welded to each other at their forward ends and being of tubular form with central openings extending to their forward ends and a third piece surrounding said projections between the first two pieces and serving to limit the spacing thereof.

4. A welded structure comprising two plates and two fasteners, the plates being embraced between the fasteners and the latter having projections extending through holes in the plates and welded to each other.

5. The method of joining two plates which consists in embracing them between fastening devices having projections extending through holes in the plates and welding said projections to each other.

6. The method of welding two pieces together face to face which consists in providing them with tubular projections, one having a shoulder engaging the other and an end entering the other, and butt welding said projections to each other.

7. The method of welding two pieces together face to face which consists in providing them with projections of tubular form with openings extending to the forward ends and with their forward ends shaped to be engaged and held against lateral movement, bringing the ends of the projections into such engagement and butt-welding said projections to each other.

8. The method of applying a sheet metal radiating plate closely about the heating element of a radiator which consists in passing the sheet metal about the heating element, applying straps at opposite sides of the heating element and welding said straps to each other through holes in the sheet metal.

9. The method of applying a sheet metal radiating metal plate closely about the steam pipe of a radiator which consists in applying the sheet metal about the pipe, applying at opposite sides of the pipe straps with projections passing through holes in the sheet metal and welding such projections together.

10. The method of applying a radiating structure closely about the heating element of a radiator which consists in applying the radiating structure to the outside of the heating element, applying straps at opposite sides of the heating element and welding them to each other through holes in the radiating structure, using metal for the straps which has a lower coefficient of thermal expansion than the metal of the heating element so that when the latter is heated its degree of contact with the radiating structure will be increased.

11. The method of applying a radiating structure closely about the heating element of a radiator which consists in applying the radiating structure to the outside of the heating element, applying straps at opposite sides of the heating element and welding them to each other through holes in the radiating structure, using steel for the straps and copper for the heating element so that as the latter is heated a degree of contact with the radiating structure will be increased.

12. A welded structure comprising at least one intermediate piece, two pieces welded to each other through a hole in said intermediate piece so as to join all said pieces together, the two outer pieces being of metal of compartively low coefficient of thermal expansion and the intermediate piece being of metal of comparatively high coefficient of thermal expansion.

13. A welded structure comprising at least one intermediate piece and two pieces welded to each other through a hole in said intermediate piece so as to join all said pieces together, the two outer pieces being of steel and the intermediate piece being of copper.

In witness whereof, I have hereunto signed my name.

GEORGE H. PHELPS.